United States Patent Office 2,853,472
Patented Sept. 23, 1958

2,853,472

POLYURETHANE ELASTOMERS CURED WITH DIISOCYANATES

Herman E. Schroeder, Kennett Square, Pa., and John M. Tinker, Wilmington, Del., assignors to E. I. du Pont de Nemours & Company, Wilmington, Del., a corporation of Delaware No Drawing. Application February 14, 1955
Serial No. 488,146

8 Claims. (Cl. 260—77.5)

This invention relates to the preparation of polyurethane elastomers, and more particularly to a method of curing or vulcanizing such products.

Curable elastomers having valuable properties may be prepared by reacting a long-chain polyalkylene ether glycol with a molar excess of an organic diisocyanate to form a linear polymer containing urethane linkages, and then reacting this polymer with a chain-extending agent containing a plurality of active hydrogen atoms, such as water, a diamine, a hydroxyamine, and the like, as disclosed and claimed in copending application Serial No. 365,270 of Hill, filed June 30, 1953. Similar products are obtained by reacting together a high molecular weight organic bischloroformate, an organic diamine and phosgene, as described in copending application Serial No. 461,657 of Carter and Ernsberger, filed October 11, 1954.

Products of this type may be cured by heating, ordinarily under pressure, if the reaction product contains free isocyanate groups. Under these conditions, the free isocyanate groups are believed to react with active hydrogen atoms in the polymer to produce cross-linking of the polymer chains. If the proportion of reactants has been such that few free isocyanate groups are present, or if the uncured reaction product has been stabilized against premature curing by the addition of some material such as a primary or secondary amine which reacts with and ties up the free isocyanate groups, it is necessary to add a curing agent prior to heating to effect vulcanization. The curing agents ordinarily employed are diisocyanates. When the conventional diisocyanates such as the tolylene diisocyanates are used as curing agents, difficulty is often encountered because of the great reactivity of these compounds which results in premature curing or "scorching" of the elastomer before the curing agent can be thoroughly incorporated. This results in a non-uniform cure and interferes with the production of molded articles, since it may not be possible to force the partially cured product to fill the mold completely.

It is an object of this invention to provide a method for curing polyurethane elastomers of the types hereinafter described which reduces the tendency toward scorching and which makes possible careful control of the desired degree of vulcanization.

It has now been found that, according to the present invention, a stable uncured polyurethane reaction product which is curable by heating with a polyisocyanate and which contains substantially no free isocyanate groups may be cured with reduced danger of scorching by incorporating therewith from 1 to 20% by weight of an arylene diisocyanate having the formula:

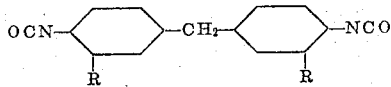

wherein R is a radical selected from the group consisting of lower alkyl and alkoxy.

In a preferred embodiment of this invention, the reaction product of a polytetramethylene ether glycol having a molecular weight between 750 and 3500, a molar excess of a tolylene diisocyanate, and water, said reaction product containing substantially no free isocyanate groups, is first mixed with from 1 to 7% by weight of 4,4'-methylene di-o-tolylisocyanate, and the mixture is heated at a temperature between 90 and 150° C. to effect vulcanization.

In carrying out the process of this invention, the uncured elastomeric reaction product is mechanically worked on a rubber mill or other mixing equipment until it forms a smooth sheet. Compounding agents such as carbon black, plasticizer, and the like are added as desired. After thorough mixing, the proper amount of the diisocyanate compound of the present invention is milled in. The compounded mass is sheeted off the mill and cured, ordinarily by heating. Temperatures of 90 to 150° C. are normally used and only enough pressure is required to force the compounded elastomer into the mold. This may range from 30 to 40 pounds up to 3000 pounds per square inch. At the temperatures mentioned, 15 to 45 minutes are usually sufficient to produce a cure. Curing may be effected without the application of pressure. The compounded elastomer may be sheeted out and calendered either alone or onto a substrate such as a plastic or textile and may then be heated to produce the cure. It is also possible to cure the product without using either pressure or elevated temperature, but this ordinarily requires substantially longer times.

The polymeric reaction products which may be cured according to this invention include those which are prepared from polyalkylene ether glycols, diisocyanates and chain-extending agents, as disclosed and claimed in copending application Serial No. 365,270 of Hill, filed June 30, 1953. The term "polyalkylene ether glycol" as used throughout the specification and claims refers to a polyalkylene ether which contains terminal hydroxy groups. These compounds are derived from the polymerization of cyclic ethers such as alkylene oxides or dioxolane or from the condensation of glycols. They are sometimes known as polyalkylene glycols or polyalkylene oxide glycols. Those useful in preparing the products of this invention may be represented by the formula $HO(RO)_nH$, in which R stands for an alkylene radical and $n$ is an integer sufficiently large that the molecular weight of the compound is at least 750, i. e., large enough that the polyoxyalkylene group $—(RO)_n—$ has a formula weight of at least 732. Not all of the alkylene radicals present need be the same. Glycols containing a mixture of radicals, as in the compound $HO(CH_2OC_2H_4O)_nH$ can be used. These glycols are either viscous liquids or waxy solids. To be of value in preparing elastomers according to this invention, the molecular weight of the glycol should be at least 750 and may be as high as 10,000. It is preferably between 750 and 3500. Polytetramethylene ether glycol, also known as polybutylene ether glycol, is the preferred glycol. Polyethylene ether glycol, polypropylene ether glycol and poly-1,2-dimethylethylene ether glycol are representative of other operable compounds.

Any of a wide variety of diisocyanates may be used in the polymerization. Aromatic diisocyanates, such as 2,4-tolylene diisocyanate, 4,4'-methylene-bis(phenyl isocyanate), 1,5-naphthylene diisocyanate and m-phenylene diisocyanate, are preferred. Aliphatic compounds such as hexamethylene diisocyanate and tetramethylene diisocyanate, and alicyclic compounds such as 1,4-cyclohexylene diisocyanate are also operable.

The chain-extending agent contains a plurality of active hydrogen atoms, no more than two atoms in the molecule having active hydrogen attached thereto. It is preferably water. By "active hydrogen atoms" is meant those hydrogen atoms which display activity according to the well-known Zerewitinoff test as described by Kohler in J. Am. Chem. Soc. 49, 3181 (1927). When water is employed as the chain extender, it is capable of reacting with two isocyanate groups with the evolution of carbon dioxide to form a urea group linking the polymer fragments to which the isocyanate groups were attached. Urea linkages are also formed if a diamine such as 2,4-tolylenediamine or ethylene diamine is used as the chain-extending agent. Other useful chain extenders include ethylene glycol, adipamide, p-aminobenzoic acid, monoethanolamine, 1,4-cyclohexanedisulfonamide, succinic acid, and hydroxypropionic acid.

In the preparation of the polymer, an excess of the diisocyanate over the polyalkylene ether glycol is used, which may be only a slight excess or may be up to 12:1 molar ratio. The glycol and the diisocyanate are ordinarily reacted by heating with agitation at a temperature of between 70° and 120° C. The chain-extending agent is then added and heating and mixing are continued at about 80° to 100° C.. During this period the molecular weight of the reaction product increases and the mass gradually forms rubbery chunks. It is then removed from the mixer and sheeted out on a rubber mill. If all of the free isocyanate groups have not reacted with the glycol or the chain-extending agent, the elastomer will have a tendency to cure rather rapidly. If the reaction product is to be stored prior to the final curing step, it is then necessary to stabilize it by adding some material such as primary or secondary nitrogen base in amount sufficent to react with the remaining free isocyanate groups, as disclosed and claimed in copending application Serial No. 379,291 of Nelson et al., filed September 9, 1953. This stabilized polymer and the self-stabilized polymer which results when enough glycol and chain-extending agent have been used to tie up all the isocyanate groups, may be stored for considerable periods without losing their ability to form a smooth band when milled on a rubber mill.

Instead of the hydrocarbon portion of the polyether glycols used in forming these products being entirely alkylene, the compound can contain arylene or cycloalkylene radicals together with the alkylene radicals as, for example, in the condensation product of a polyalkylene ether glycol with $\alpha,\alpha'$-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylylene radicals. Elastomers made using polyalkylene-arylene or polyalkylene-cycloalkylene ether glycols have improved freeze resistance as compared with the corresponding elastomers containing no cyclic radicals.

Another class of glycols useful in making polyurethanes curable according to this invention are the polyether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the glycol has a molecular weight of at least 750. These products may be made by condensing together glycols and thioglycols in the presence of a catalyst such as p-toluene sulfonic acid.

There may also be used as in the process of this invention products made by the reaction of a diisocyanate and a chain-extending agent with a long chain compound having a molecular weight of at least 750 and having at each end a functional group, said functional groups being connected by a hydrocarbon or a halogen-substituted hydrocarbon chain. The functional groups at the ends of the long chain compound are hydroxyl groups. The hydrocarbon chain connecting the functional groups is free of substituents other than halogen atoms and monovalent hydrocarbon radicals, such as methyl, phenyl, etc., preferably containing no more than 8 carbon atoms.

Such long chain compounds are obtained, for example, by polymerizing ethylenically unsaturated monomers in the presence of free radical catalysts such as the aliphatic azo dinitriles or dicarboxylates. The most suitable ethylenically unsaturated monomers are conjugated dienes such as butadiene, isoprene, 2-chlorobutadiene and the like. Mixtures may be used. For example, styrene or isobutylene may be copolymerized with a diene to give the long chain skeleton. The carbon chain in the long chain compound may be saturated or unsaturated.

Elastomers which are similar to those formed from the reaction between long chain glycols of the types mentioned above, diisocyanates and water may be made from the reaction of a high molecular weight organic bis-chloroformate, an organic diamine and phosgene, as described and claimed in pending application Serial No. 461,657 of Carter et al., filed October 11, 1954. These products may be cured advantageously by the process of this invention.

It is obvious from the above described methods by which the uncured polyurethane elastomeric reaction products may be prepared and the reactants used that these products will contain a plurality of intralinear radicals of the formula

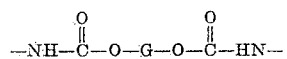

wherein the bivalent radical —O—G—O— is obtained by removing the terminal hydrogen atoms of a polymeric glycol, said glycol having a molecular weight of at least 750 and being selected from the group consisting of polyalkylene-ether glycols, polyalkylene-arylene ether glycols, polyalkylene-cycloalkylene ether glycols, polyalkylene ether-thioether glycols, polyaliphatic hydrocarbon glycols, and halogen-substituted polyaliphatic hydrocarbon glycols.

The tendency of the compounded elastomers to cure prematurely or to scorch may be measured by the following tests.

*Extruder scorch test.*—Scorchiness may also be measured by extruding the polymer composition through a die, recycling the extruded material, and measuring the time elapsing until the extruded strip begins to have a rough surface. As employed in the examples which follow, the test is carried out using a Royle No. 4 extruder having a 6" worm screw turning at 18 R. P. M. The worm, barrel and head are heated to 93° C. with steam before introducing the compounded stock. The stock is then added and when it begins to emerge through the die, heating on the worm and barrel is discontinued and cold water is passed through, but the head is held at 93° C. with steam. The extruded strip is fed back into the feed barrel. The amount of composition used is such that there is on the average a 4 minute residence time in the extruder and 1 minute time on the outside before being fed back in. As extrusion continues, the strip is at first slightly non-uniform because of incomplete mixing. As extrusion continues, the band becomes smooth and homogeneous until the point when scorching begins. At this time a gradual surface roughness develops which soon becomes pronounced.

*Mooney scorch test.*—This is a standard method of determining the curing characteristics of elastomers by use of a shearing disc viscometer. It is ASTM Test D-1077–49T as described in "ASTM Standards on Rubber Products," published by the American Society for Testing Materials. This test measures the change in viscosity of the curable mixture as a function of time, while the sample is held at a specific temperature. The compositions described in the examples which follow were tested at 100° C. and 121° C. using a small rotor.

The process of this invention is illustrated by the following examples, in which parts are by weight unless otherwise indicated.

EXAMPLE I

*Preparation of 4,4'-methylene di-o-tolylisocyanate*

64 parts of 3,3'-dimethyl-4,4'-diaminodiphenylmethane is dissolved in 350 parts of o-dichlorobenzene and then 20 parts of the o-dichlorobenzene is distilled off to remove any trace of water. The solution is then cooled to 85 to 90° C.

In a separate vessel, equipped with agitation, cooling and a reflex condenser, 70 parts of phosgene is dissolved in 330 parts of o-dichlorobenzene at 0 to 5° C. The amine solution previously prepared is then added as rapidly as possible while agitating and keeping the temperature between 0 and 15° C. After the addition is complete, the mass is stirred for one hour. It is then heated to 100 to 110° C. and held there for 30 minutes. Hydrogen chloride and phosgene are evolved during this heating period. Phosgene is then passed into the vessel at a rate of 6 to 8 parts per hour, and the temperature is raised to 180° C. Agitation at this temperature while passing phosgene is continued for 6 hours or until no more hydrogen chloride is given off.

The mass is then cooled to 90 to 100° C. while blowing nitrogen through the charge to remove residual phosgene. The reaction mass is filtered and 725 parts of filtrate is obtained.

The filtrate is transferred to a still and the o-dichlorobenzene is distilled off. 83 parts of crude 4,4'-methylene di-o-tolylisocyanate is obtained.

To the crude diisocyanate is added 333 parts of carbon tetrachloride to dissolve it and then 33 parts of diatomaceous earth (Super Cel) and the mass is stirred 30 minutes. It is then filtered and the filter cake is washed with 133 parts of carbon tetrachloride. To the combined filtrate and wash is added 33 parts of activated carbon (Darco-S-51) and the mixture is heated to reflux for 30 minutes. It is then filtered and washed with 133 parts of carbon tetrachloride. The combined filtrate and wash is then distilled to remove the carbon tetrachloride and 77 parts of purified 4,4'-methylene di-o-tolylisocyanate is obtained. It analyzes 98% pure by NCO analysis and has a melting point of 33° C. It is in the form of a pale yellow crystalline solid.

EXAMPLE II

A polytetramethylene ether glycol-diisocyanate elastomer is prepared as follows:

2895 parts of a polytetramethylene ether glycol of molecular weight 965 is heated and stirred with 348 parts of toluene-2,4-diisocyanate for 3 hours at 100° C. 200 parts of the resulting polyurethane is placed in a Werner-Pfleiderer mixer with 0.355 parts of water and mixed for 15 minutes at 70° C. Then 24.7 parts of toluene-2,4-diisocyanate is added and mixing is continued for 2 hours at 70–75° C. Then 8.11 parts of water is added and mixing is continued for 21 minutes while the temperature rises to 100° C. and the mass turns into rubbery chunks. The rubbery mass is promptly removed from the mixer and placed on a rubber roll mill where 0.42 part of piperidine is added for each 100 parts of polymer and milled in. This stabilized polymer is used in the following tests:

The resistance of a compounded polymer to premature curing is tested by the Mooney scorch test as described above. As a comparison of the effect of 4,4'-methylene di-o-tolylisocyanate, there is used 1,3-bis(3-isocyanato-p-tolyl)urea. In the first case 100-part samples of the elastomer are compounded on a rubber mill, respectively with 4 parts of 4,4'-methylene di-o-tolylisocyanate and 6 parts of 1,3-bis(3-isocyanato-p-tolyl)urea. The Mooney scorch test on these samples then showed the following results:

TABLE 1.—MOONEY SCORCH—121° C.

| Minutes | 7 | 22 | 26 | 31 | 35 | 41 |
|---|---|---|---|---|---|---|
| 4,4'-methylene di-o-tolylisocyanate | 48 | ---- | 54 | 58 | 62 | 68 |
| 1,3-bis(3-isocyanato-p-tolyl)urea | 62 | 72 | 81 | ---- | ---- | ---- |

In the second series, 100-part samples of the elastomer are milled with 15 parts of high abrasion furnace black and respectively with 4.92 parts of 4,4'-methylene di-o-tolylisocyanate and 6 parts of 1,3-bis(3-isocyanato-p-tolyl)urea. The Mooney viscosities are given in the table below:

TABLE 2.—MOONEY SCORCH—121° C.

| Minutes | 7 | 16 | 20 | 21 |
|---|---|---|---|---|
| 4,4'-methylene di-o-tolylisocyanate | 58 | ---- | 68 | 69 |
| 1,3-bis(3-isocyanato-p-tolyl)urea | 79 | 89 | ---- | 100 |

In the third series, 100-part samples of the elastomer are milled respectively with 6.86 parts of 4,4'-methylene di-o-tolylisocyanate and 8 parts of 1,3-bis(3-isocyanato-p-tolyl)urea, these latter parts being molar equivalents. The Mooney viscosities are shown in the table below:

TABLE 3.—MOONEY SCORCH—100° C.

| | Low Reading | After 45 min. |
|---|---|---|
| 4,4'-methylene di-o-tolylisocyanate | 47 | 50 |
| 1,3-bis(3-isocyanato-p-tolyl)urea | 73 | 85 |

100-part samples of the elastomer are milled with 4.92 parts of 4,4'-methylene di-o-tolylisocyanate and cured in molds in a press for 15 minutes at 134° C. The resulting elastomer shows the following properties at 25° C.:

TABLE 4

| | |
|---|---|
| Tensile strength at the break___lbs. per. sq. in__ | >5100 |
| Modulus at 300% elongation_____do____ | 2430 |
| Elongation at break_____percent__ | >420 |
| Hardness, Shore A_____ | 74 |
| Yerzley resilience_____ | 79 |

EXAMPLE III

The elastomer prepared as above is compounded on a rubber mill according to the following formulations. Parts are by weight.

| | A | B |
|---|---|---|
| Elastomer | 100 | 100 |
| High abrasion furnace black | 15 | 15 |
| "Hycar" 1312* | 15 | 15 |
| 1,3-bis(3-isocyanato-p-tolyl)urea | 8 | ---- |
| 4,4'-methylene di-o-tolylisocyanate | ---- | 5.2 |

*Low molecular weight fluid acrylonitrile-butadiene copolymer from B. F. Goodrich Chemical Co.

Each of these formulations is subjected to the extruder scorch test as described above.

The results of these tests are shown in the table below:

| Cumulative Time In Minutes | A Temp., ° C. | A Appearance | B Temp., ° C. | B Appearance |
|---|---|---|---|---|
| 5 | 245 | Smooth | 235 | Smooth. |
| 10 | 220 | | 230 | |
| 15 | 235 | | 230 | |
| 20 | 240 | | 225 | |
| 25 | 250 | Rough edges | 220 | Still smooth. |
| 35 | 255 | Rougher | 215 | |
| 45 | 265 | Scorched | 220 | |
| 60 | | | 225 | Do. |
| 90 | | | 245 | |
| 120 | | | 245 | Do. |
| 135 | | | 250 | Beginning to roughen. |
| 140 | | | 260 | Scorched. |

It is thus evident that a compounded stock containing 4,4'-methylene di-o-tolylisocyanate is some three times as safe from a processing standpoint.

The arylene diisocyanates of the present invention, as represented by the formula, $$OCN-\underset{R}{\underset{|}{C_6H_3}}-CH_2-\underset{R}{\underset{|}{C_6H_3}}-NCO$$

wherein R is a radical selected from the group consisting of lower alkyl and alkoxy, exhibit a distinct advantage over previously known diisocyanate curing agents for polyurethane elastomeric reaction products. More particularly, as evidenced by the above examples, 4,4'-methylene di-o-tolylisocyanate does not exhibit the initial toughening effect on the elastomer as does 1,3-bis(3-isocyanato-p-tolyl)urea, which toughening effect results in greater heat generation and faster "scorch." Furthermore, this advantage is accomplished with essentially no effect on the viscosity of the elastomer.

Although this invention is particularly useful and has been illustrated with particular reference to elastomers formed from polyalkylene ether glycols, diisocyanates and chain extending agents, it has application generally to the curing of any elastomeric materials composed of polymeric chains containing reactive hydrogen atoms and which may be cured by cross-linking at the active hydrogen sites.

The process of this invention in which an arylene diisocyanate, such as 4,4'-methylene di-o-tolylisocyanate, is used as a curing agent unexpectedly permits longer milling of the polymer without scorching than is possible with other diisocyanate curing agents and the present invention greatly facilitates the handling of the polymer on conventional rubber machinery.

The cured elastomers prepared according to the present process may be used for the same purposes as other elastomers. From them may be prepared such articles as tires, inner tubes, belts, hose and tubes, wire and cable jackets, footwear, sponge, coated fabric and various other molded or dipped articles.

The basic elastomeric properties of these products may be varied by suitable compounding. The type and amount of the compounding agent to be used is dependent upon the use for which the elastomer is intended. Some of the more important compounding agents which are of value with these elastomers are carbon black, clay, silica, talc, zinc and magnesium oxides, calcium and magnesium titanium dioxide and plasticizers. Inorganic and organic coloring agents may be incorporated to give well defined colored products. The natural color of the elastomer is a pale yellow or a light amber.

The compounding agents may be mixed or incorporated with the product at the same time that the diisocyanate vulcanizing agents are added. Conventional rubber processing machinery such as rubber mills and Werner-Pfleiderer or Banbury mixers may be used. The resulting compounded stocks may be shaped or cured in conventional rubber industry equipment. Alternatively the stocks may be dissolved or extended with solvents for application to surfaces upon which they may be cured after evaporation of the solvent.

As many apparently widely different embodiments of this invention may be made without departing from the spirit and scope thereof, it is to be understood that this invention is not limited to the specific embodiments thereof except as defined in the appended claims.

What is claimed is:

1. The process of curing a stable uncured polyurethane elastomeric reaction product of a polytetramethylene ether glycol having a molecular weight of at least 750, a molar excess of an aromatic diisocyanate and water, said reaction product containing substantially no free isocyanate groups, which comprises incorporating therewith from about 1 to 20% by weight of an arylene diisocyanate having the formula:

$$OCN-\underset{R}{\underset{|}{C_6H_3}}-CH_2-\underset{R}{\underset{|}{C_6H_3}}-NCO$$

wherein R is a radical selected from the group consisting of lower alkyl and lower alkoxy radicals, and heating the mixture at a temperature between about 90 and 150° C. to produce a cured elastomer.

2. The process of claim 1 in which the arylene diisocyanate curing agent is 4,4'-methylene di-o-tolylisocyanate.

3. A cured elastomer obtained by the process of claim 6.

4. A process according to claim 6 in which the heating step is carried out in a mold under pressure to form a shaped, cured elastomer.

5. A shaped, cured elastomer obtained by the process of claim 4.

6. The process of curing a stable uncured polyurethane elastomeric reaction product which is curable by heating with a polyisocyanate and which contains substantially no free isocyanate groups, said polyurethane elastomeric reaction product containing a plurality of intralinear radicals of the formula $$-NH-\overset{O}{\underset{\|}{C}}-O-G-O-\overset{O}{\underset{\|}{C}}-HN-$$

wherein the bivalent radical —O—G—O— is obtained by removing the terminal hydrogen atoms of a polymeric glycol, said glycol having a molecular weight of at least 750 and being selected from the group consisting of polyalkylene-ether glycols, polyalkylene-arylene ether glycols, polyalkylene-cycloalkylene ether glycols, polyalkylene ether-thioether glycols, polyaliphatic hydrocarbon glycols, and halogen-substituted polyaliphatic hydrocarbon glycols, which comprises incorporating with said polyurethane elastomeric reaction product from about 1 to 20% by weight of an arylene diisocyanate having the formula $$OCN-\underset{R}{\underset{|}{C_6H_3}}-CH_2-\underset{R}{\underset{|}{C_6H_3}}-NCO$$

wherein R is a radical selected from the group consisting of lower alkyl and lower alkoxy radicals, and heating the mixture at a temperature between 90 and 150° C. to produce a cured elastomer.

7. The process of claim 6 in which the bivalent radical —O—G—O— in the polyurethane reaction product is obtained by removing the terminal hydrogen atoms of a polyalkyleneether glycol.

8. The process of claim 7 wherein the polyalkyleneether glycol is a polytetramethyleneether glycol.

References Cited in the file of this patent

UNITED STATES PATENTS

| 2,625,535 | Mastin et al. | Jan. 13, 1953 |
| 2,702,797 | Rugg | Feb. 22, 1955 |

FOREIGN PATENTS

| 898,682 | Germany | July 8, 1944 |

OTHER REFERENCES

Siefkin: Liebig's Annalen de Chemie, volume 562, 1949, pp. 121, 130, 131.